United States Patent
Kunow et al.

(10) Patent No.: US 12,470,122 B2
(45) Date of Patent: Nov. 11, 2025

(54) FLYBACK CONVERTER SYSTEMS AND METHODS

(71) Applicant: OneSubsea IP UK Limited, London (GB)

(72) Inventors: Peter Kunow, Drahnsdorf (DE); Volker Phielipeit-Spiess, Celle (DE)

(73) Assignee: OneSubsea IP UK Limited, London (GB)

( * ) Notice: Subject to any disclaimer, the term of this patent is extended or adjusted under 35 U.S.C. 154(b) by 237 days.

(21) Appl. No.: 18/253,737

(22) PCT Filed: Nov. 19, 2021

(86) PCT No.: PCT/US2021/060076
§ 371 (c)(1),
(2) Date: May 19, 2023

(87) PCT Pub. No.: WO2022/109260
PCT Pub. Date: May 27, 2022

(65) Prior Publication Data
US 2024/0006979 A1    Jan. 4, 2024

Related U.S. Application Data

(60) Provisional application No. 63/198,869, filed on Nov. 19, 2020.

(51) Int. Cl.
*H02M 1/00*     (2007.01)
*H01F 3/14*     (2006.01)
(Continued)

(52) U.S. Cl.
CPC ............ *H02M 1/0064* (2021.05); *H01F 3/14* (2013.01); *H02M 1/342* (2021.05); *H02M 3/33523* (2013.01)

(58) Field of Classification Search
CPC ............ H02M 1/0064; H02M 1/342; H02M 3/33523; H01F 3/14
See application file for complete search history.

(56) References Cited

U.S. PATENT DOCUMENTS 5,506,764 A * 4/1996 Hon ................. H02M 3/335
                                                      363/21.16
6,473,318 B1   10/2002 Qian et al.
(Continued)

FOREIGN PATENT DOCUMENTS

| CN | 104022655 A | 9/2014 |
| CN | 104993682 A | 10/2015 |

(Continued)

OTHER PUBLICATIONS

Prieto, R. et al., "Influence of the Winding Strategy in Toroidal Transformers", Proceedings of the 24th Annual Conference of the IEEE, Aachen, Germany, 1998, 1(31), pp. 359-364.

(Continued)

*Primary Examiner* — Jue Zhang
(74) *Attorney, Agent, or Firm* — Jeffrey D. Frantz

(57) ABSTRACT

A flyback converter system is provided. The flyback converter system includes a transformer system having a magnetic core. The flyback converter system further includes a flyback converter circuitry having a primary circuitry and a secondary circuitry, where the flyback converter circuitry is electrically coupled to the transformer system, and where the flyback converter circuitry is configured to recycle energy from a leakage flux via the primary circuitry and to transfer the energy to the secondary circuitry.

17 Claims, 8 Drawing Sheets

(51) Int. Cl.
*H02M 1/34* (2007.01)
*H02M 3/335* (2006.01)

(56) References Cited

U.S. PATENT DOCUMENTS

| | | | |
|---|---|---|---|
| 2010/0188872 A1* | 7/2010 | Matsumoto | H02M 3/33523 363/21.04 |
| 2012/0243268 A1* | 9/2012 | Kern | H01F 30/12 336/170 |
| 2017/0070152 A1 | 3/2017 | Liu | |
| 2018/0294734 A1 | 10/2018 | Song et al. | |
| 2018/0358902 A1* | 12/2018 | Duvnjak | H02M 3/33592 |

FOREIGN PATENT DOCUMENTS

| | | | |
|---|---|---|---|
| JP | 2012023881 A | 2/2012 |
| TW | 201622324 A | 6/2016 |
| WO | 2019075379 A1 | 4/2019 |
| WO | 2020219116 A1 | 10/2020 |

OTHER PUBLICATIONS

Search Report and Written Opinion of International Patent Application No. PCT/US2021/060076 dated Mar. 14, 2022; 10 pages.

* cited by examiner

FLYBACK CONVERTER SYSTEMS AND METHODS

CROSS REFERENCE TO RELATED APPLICATIONS

The present application is a National Stage Entry of International Patent Application No. PCT/US2021/060076, filed on Nov. 19, 2021, which claims priority benefit of U.S. Provisional Application No. 63/198,869, filed Nov. 19, 2020, the entirety of which is incorporated by reference herein and should be considered part of the specification.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In certain operations, a flyback converter may be used in alternating current (AC)/direct current (DC) and/or DC/DC conversion to convert voltage and provide for galvanic isolation. For example, in subsea operations, hydrocarbon fluids (e.g., oil and natural gas) may be obtained from a subterranean geologic formation, referred to as a reservoir, by drilling a well that penetrates the subterranean geologic formation. Electrically powered systems may use flyback converter systems in diverse industries, including in the oil & gas industry, to power certain equipment. It would be beneficial to improve flyback converter systems and methods.

SUMMARY

In an embodiment, a flyback converter system is provided. The flyback converter system includes a transformer system comprising a magnetic core. The flyback converter system further includes a flyback converter circuitry comprising a primary circuitry and a secondary circuitry, where the flyback converter circuitry is electrically coupled to the transformer system, and where the flyback converter circuitry is configured to recycle energy from a leakage flux via the primary circuitry and to transfer the energy to the secondary circuitry.

In an embodiment, a method for manufacturing a flyback converter system is provided. The method includes manufacturing a transformer system having a magnetic core. The method further includes manufacturing a flyback converter circuitry having a primary circuitry and a secondary circuitry, wherein the flyback converter circuitry electrically coupled to the transformer system, and wherein the flyback converter circuitry is configured to recycle energy from a leakage flux via the primary circuitry and to transfer the energy to the secondary circuitry.

In an embodiment, a power supply is provided. The power supply includes a flyback converter system having a transformer system comprising a magnetic core, and a flyback converter circuitry. The flyback converter circuitry further includes a primary circuitry and a secondary circuitry, wherein the flyback converter circuitry is electrically coupled to the transformer system, and wherein the flyback converter circuitry is configured to recycle energy from a leakage flux via the primary circuitry and to transfer the energy to the secondary circuitry, wherein the power supply system is configured to supply power via the secondary circuitry.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
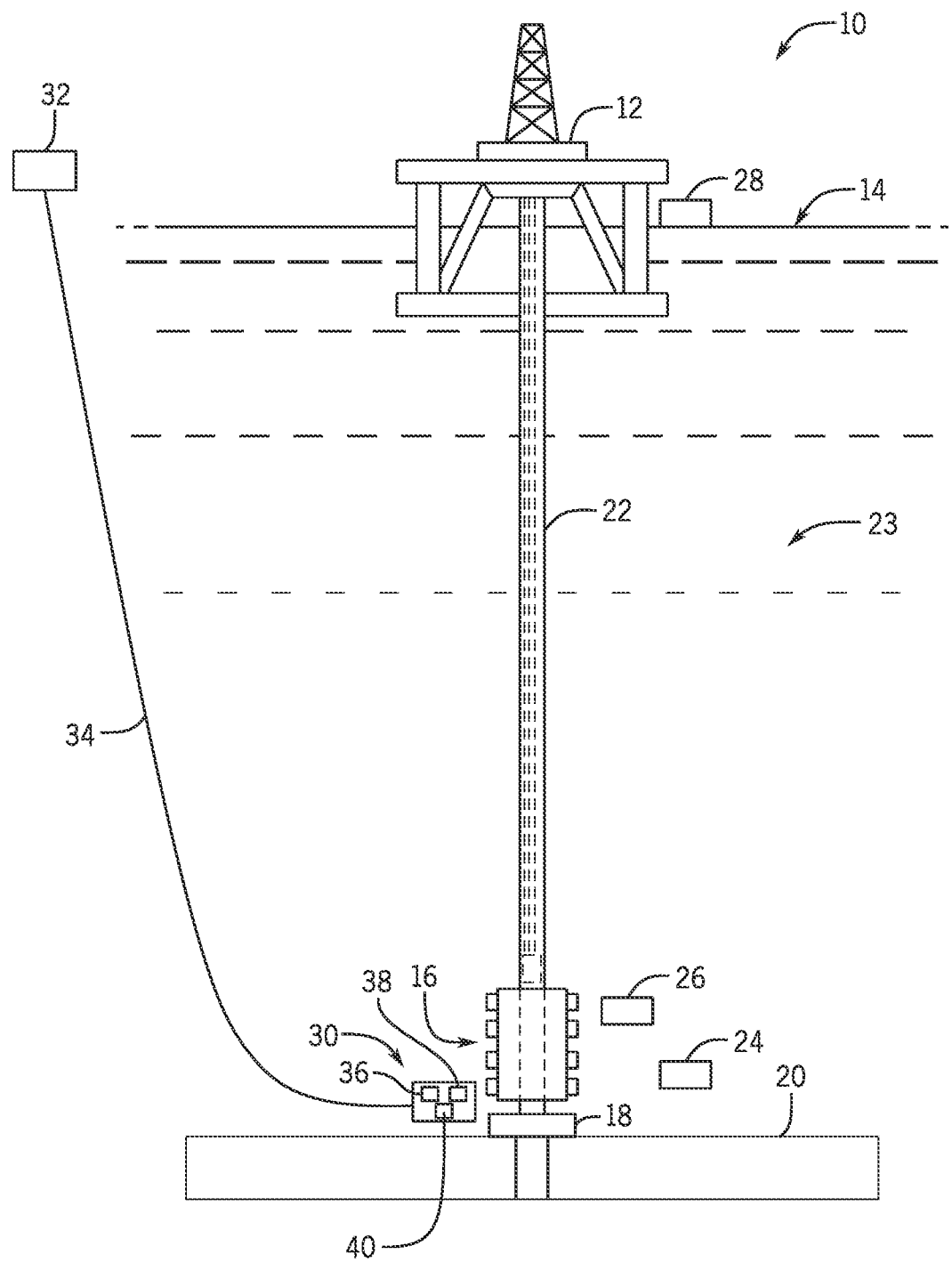
FIG. 1 is a schematic illustration of a subsea system that includes a flyback converter system, according to an embodiment of the present disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "communications" encompasses one-way transmissions, two-way interchange of information, or a combination thereof.

According to certain embodiments, the techniques described herein involve a system and methodology for flyback converters and for transformers used in flyback converters. The flyback converter systems described herein may include, for example, deep sea flyback converter systems that may be used in oil and gas applications, such as seaborne drilling and hydrocarbon extraction operations, as a power supply or component of a power supply. It is to be noted that the flyback converter systems and methods described herein may be used for a number of applications in addition to or in lieu of oil and gas applications, including industrial applications, construction applications, manufacturing applications, and so on. Indeed, the flyback converter systems described in more detail below may be used to take as input DC and/or AC voltage and convert the voltage into certain desired values or range and values while providing for galvanic isolation and enhanced reliability in a variety of applications.

According to certain embodiments, the flyback systems described herein include electrical circuitry having certain techniques that improve electrical efficiency. For example, leakage inductance energy recycling techniques may be used. In certain embodiments, switching devices (e.g., transistors with diodes) may be controlled via a controller to recapture certain inductance energy via, for example, one or more capacitors. Accordingly, energy that may have previously "leaked" out of the flyback converter circuitry may now be recaptured and reused, thus improving energy efficiency.

In certain embodiments, a transformer system is provided, to be used in conjunction with the electrical circuitry provided herein. The transformer system may include a high permeability core (e.g., toroidal core) with a dedicated air gap. The transformer system may additionally apply a winding technique on primary and/or secondary windings to further reduce inductance leakage energy. By combining the electrical circuitry, control systems, and transformer systems described herein, test results may show an improved electrical efficiency, such as electrical efficiency greater than 87% (e.g., 90-97%).

Turning now to FIG. 1, the figure is an embodiment of a subsea system 10. As shown, the subsea system 10 includes an offshore vessel or platform 12 at a sea surface 14. A stack assembly 16 (e.g., a blowout preventer (BOP) stack and/or a lower marine riser package (LMRP)) is mounted to a subsea production tree 18 at a sea floor 20. A riser 22 (e.g., marine drilling riser) extends from the platform 12 to the stack assembly 16. An untethered underwater communications system 23 is also shown, which may include a subsea transmitter 24 that may be communicatively coupled to oil and gas equipment, such as equipment 16, 18 or subsea equipment 26 (e.g., sensors, actuators, valves, positioners, logging while drilling (LWD) equipment, measurement while drilling (MWD) equipment, and the like) to provide data to the surface 14. Accordingly, a receiver 28 may be used that is suitable for receiving data transmitted via the transmitter 24.

Also shown is a flyback converter system 30 operatively coupled to an onshore station 32 via electric conduits 34 for use, for example, as a power supply. In use, the flyback converter system 30 may take as input DC and/or AC voltage via the conduits 34 and convert the voltage into certain output voltages at desired values or range and values while providing for galvanic isolation between the conduits 34 and systems (e.g., subsea systems) that may use the converted electric power to operate. For example, a first electric power may be transmitted from the onshore station 32 via the conduit 34 and then converted into a second electric power for use in subsea operations by the flyback converter system 30. The flyback converter system 30 may include an energy recapture circuitry 36 and a transformer system 38. The flyback converter system 30 may additionally include a control system 40. The control system 40 may actuate certain devices of the flyback converter circuitry 36 as further described below, to recapture energy (e.g., inductance energy) and improve the efficiency of the flyback converter system 30. By providing for the control system 40, the flyback converter circuitry 36, and the transformer system 38, the techniques described herein may provide electrical efficiencies of 97% or more.

Figure 2:
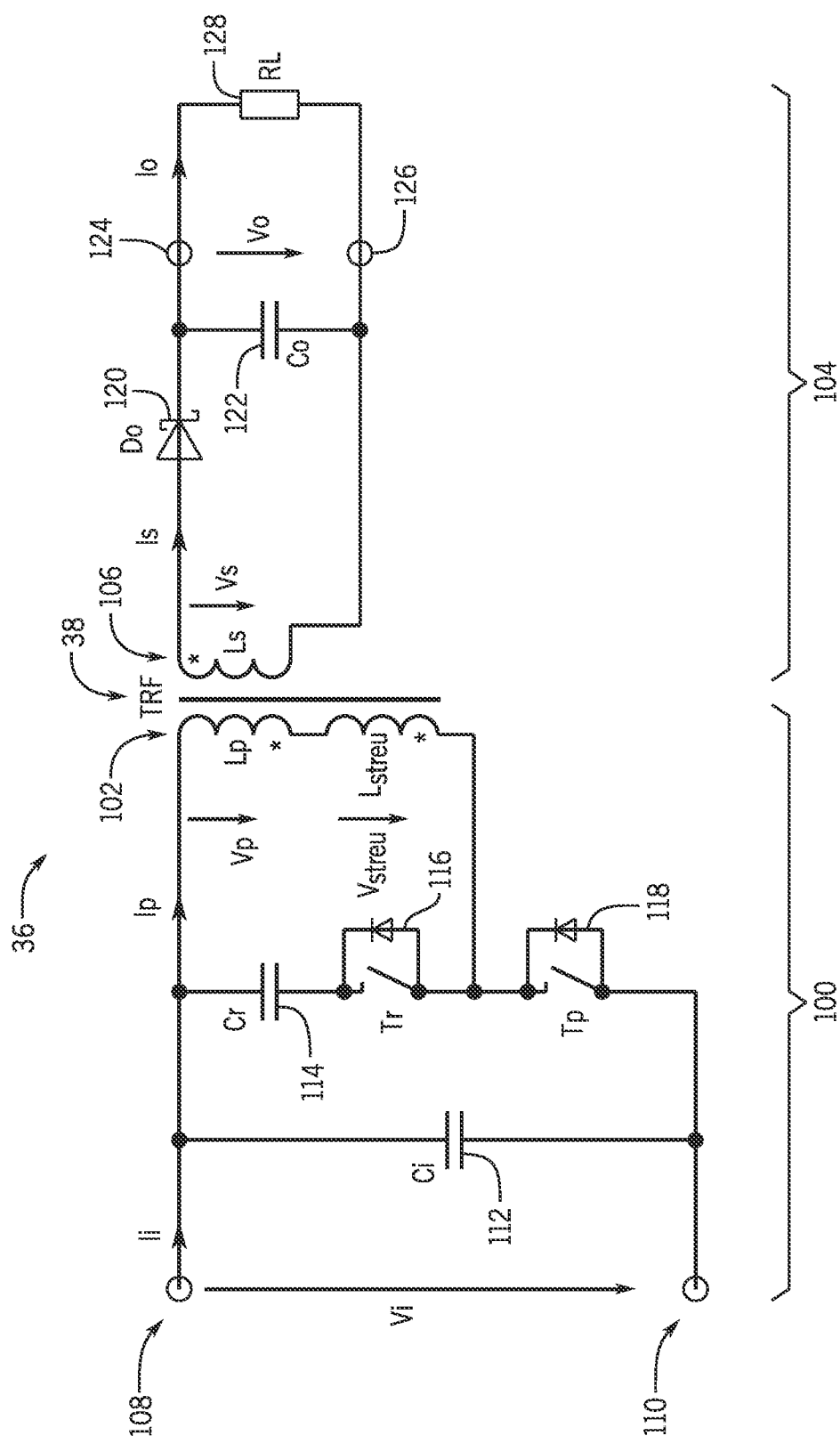
FIG. 2 is a schematic illustration of a flyback converter circuitry, according to an embodiment of the present disclosure.

It may be beneficial to describe further details of the flyback converter circuitry 36, as illustrated in FIG. 2. More specifically, the figure depicts an embodiment of the flyback converter circuit 36, which may be used in oil and gas applications as well as other applications (e.g., construction applications, industrial applications, power distribution applications, and so on). In the depicted embodiment, the flyback converter system is divided into a primary section 100 electrically coupled to primary windings 102 of the transformer system 38 and a secondary section 104 electrically coupled to secondary windings 106 of the transformer system 38. Input nodes 108, 110 may receive electric power transmitted, for example, from the onshore station 32 via conduits 34. The power transmitted to input nodes 108, 110 may be alternating current (AC) power or direct current (DC) power. In some circumstances, the conduits 34 may travel over long distances, such as hundreds of miles. Accordingly, power transmission losses may occur. The flyback converter system 30 may use the circuitry 36 in conjunction with the transformer system 38 to provide for higher electrical efficiencies, thus enabling more reliable and efficient power delivery.

In the depicted embodiment, the flyback converter primary section 100 includes two capacitors 112, 114 and two switching devices (e.g., transistor/diode combinations) 116, 118. The switching devices 116, 118 may be operatively coupled to the control system to be controlled by the control system 40 during operations of the flyback converter system 30. The secondary section 104 is shown as having a diode 120, capacitor 122, and outputs 124, 126 that may be used to power a load 128. The flyback converter system 30 would be an ideal potential isolating system (e.g., "all round" converter) where Vi>Vo, Vi<Vo where Vi is input voltage and Vo is output voltage if the two windings (primary 102 and secondary 106 windings) in the transformer system 38 were not present. However, the transformer windings are used for galvanic isolation. Because the windings may not be in the same location, there is a differential magnetic flux that occurs during operation of the flyback converter system 30. That is, as the primary section 100 is powered on and off (e.g., via the switching devices 116, 118), a differential or leakage magnetic flux is created. The differential or leakage flux may account for a certain percentage of the total flux (e.g., between 4 and 10%) and may thus incur energy inefficiencies because the energy in the differential flux may be converted into heat, for example. The flyback converter system may instead store some or all of the differential flux energy and reuse the energy in providing output voltage, thus improving energy efficiency.

In one embodiment, the switching device 116 is used as an energy recycling device when positioned in series with the capacitor 114 (e.g., energy recycling capacitor). The leakage energy of the leakage inductance is charged into the capacitor 114 via the diode of the transistor 116 and can then be transferred to the secondary side once transistor 116 is switched-on. The energy recycling process is controlled from the control system 40.

Figure 3:
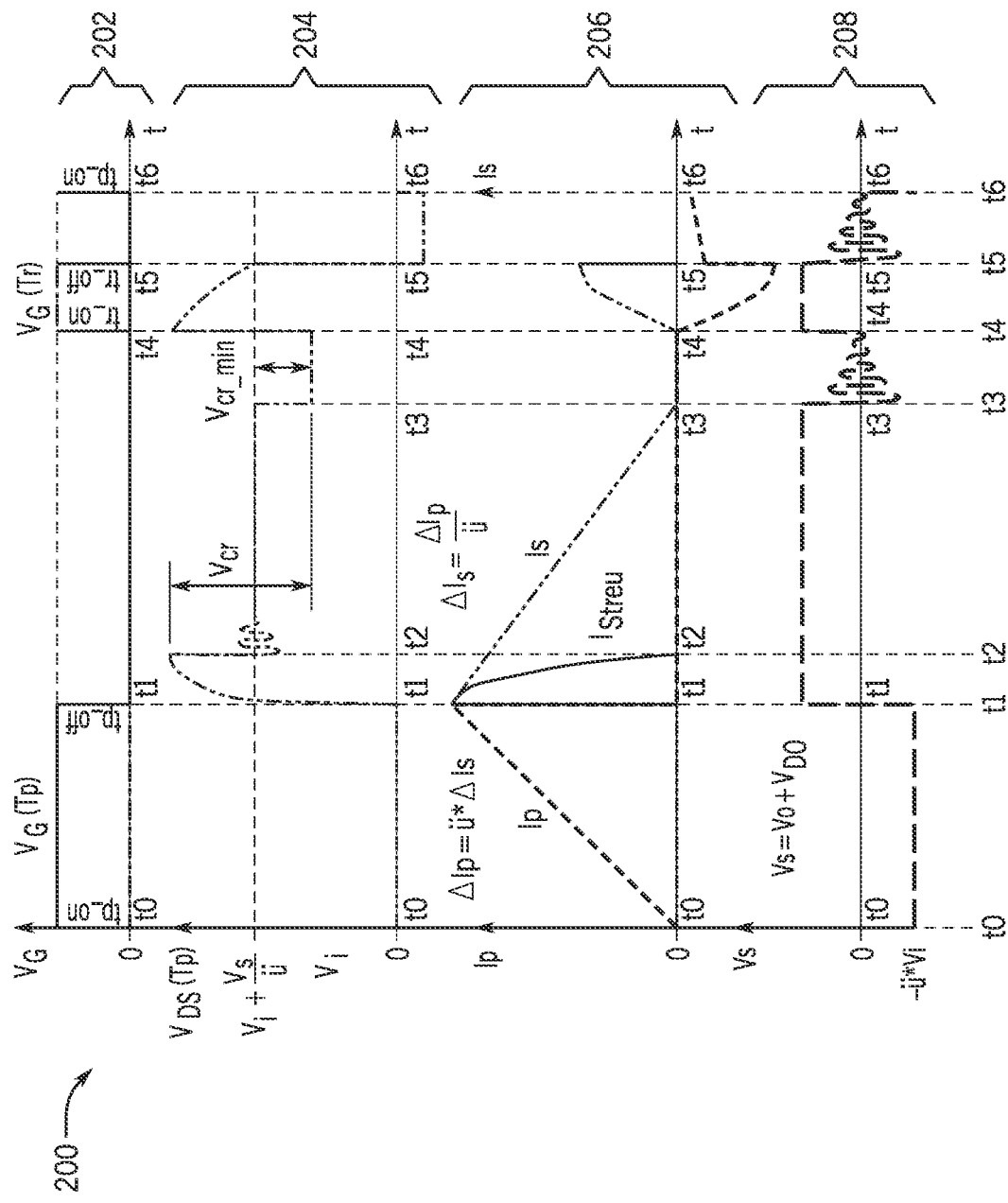
FIG. 3 is a timing diagram illustrating operations of the flyback converter system of FIG. 1 during one cycle, according to an embodiment of the present disclosure.

As illustrated in FIG. 2, Ii refers to input current incoming into nodes 108, 110 while Ip refers to current through primary windings 102. Vp refers to voltage at the primary windings 102 while Vstreu refers to voltage of magnetic flux leakage whose energy may now be stored in the capacitor 114. It may be beneficial to describe an example cycle of operations of the flyback converter system 36 as the control system 40 toggles, for example, the switching devices 116, 118. Turning now to FIG. 3, the figure is an embodiment of a timing diagram 200 illustrating concurrent signals (e.g., voltages, current) of various portions of the flyback converter system 30 during various times in one cycle of operations of the flyback converter 30.

In the depicted embodiment, the timing diagram includes a switching device toggle portion 202 illustrating on/off toggling of the switching devices 116, 118. A drain-source voltage (Vds) portion 204 is also shown, depicting the rise and fall of Vds through the switching device 118 (e.g., Vds through the transistor of the switching device 118). A portion 206 is additionally shown, illustrating the rise and fall of the primary side 100 current (Ip) and the secondary side 104 current (Is). A portion 208 is further shown, illustrating the rise and fall of voltage through the secondary portion 104 (Vs) of the circuitry 36.

At time between t0 and t1, the switching device 118 may be turned on as shown in portion 202 to connect Vi (e.g., the voltage at input nodes 108, 110) to the primary windings 102 with inductance (Lp+Lstreu). Ip is shown as increasing linearly up to a desired value in portion 206. At time t1, the switching device 118 may be turned off as shown in portion 202. At time between t1 and t3, the energy stored in the magnetic flux now may discharge linearly as Is (Ls) on the secondary side 104 via diode 120 in capacitor 122 at an approximately constant voltage Vo (e.g., voltage across output nodes 124, 126), as shown in portion 206. Also, at time between t3 and t4, the energy stored in the magnetic flux may now discharge sinusoidally as Istreu (Lstreu) on the primary side 100 via the reverse diode in switching device 116 into capacitor 114 as shown in portion 206.

At time between t4 and t5, the switching device 116 is toggled on to switch Vcr (Voltage for the capacitor 114) in phase with the output voltage at the primary winding 102. A large portion (e.g., approximately between 90 and 96%) of the capacitor 114 energy may then be transferred to the secondary side 104 in the "flux converter" operating mode. The secondary side current Is is zero (0) when Vcr=Vcr_min and the switching device 116 is switched off.

At time between t5 and t6 the leakage inductance Lstreu, however, may contain the remaining percentage (e.g., between 4 and 10%) of the capacitor 114 energy and may now cause, with negative primary current −Ip, a reloading of the capacitors 112, 114 up to the recovery of the remaining energy via the reverse diode of the switching device 118 into the input capacitor 112. Since the negative diode residual voltage (e.g., approximately between −0.8 volts (V) and −0.6 V) is present at the switching device 118 and the switching device 118 is switched on again in this phase as shown in portion 202, the circuit 36 may now operate in a Zero Voltage Switching (ZVS) mode with certain advantages, for example, allowing for operation at a higher frequency and at higher input voltages without sacrificing efficiency. The maximum voltage Vcr_max is inversely proportional to its capacitance and may be calculated via $$Vcr_{max} = \sqrt{\frac{Lstreu * I_{p_{max}}^2}{Cr}}$$

if Lstreu and Ip_max are known. Because the recycling capacitor Cr (e.g., capacitor 114) has a much larger capacitance than the parasitic primary transformer capacitances, the ratio of Vs/ü (where ü is transformation ratio of the transformer 38) to Vi_max is not as important in view of ZVS. It is to be noted that the timing diagram 200 is for a single cycle, where cycles may be in the Kilohertz and/or Megahertz range, for example. By toggling the respective switching devices 116, 118, the control system 40 may operate the flyback converter system 30 at higher efficiencies, providing power to a variety of devices, including subsea devices.

Figure 4:
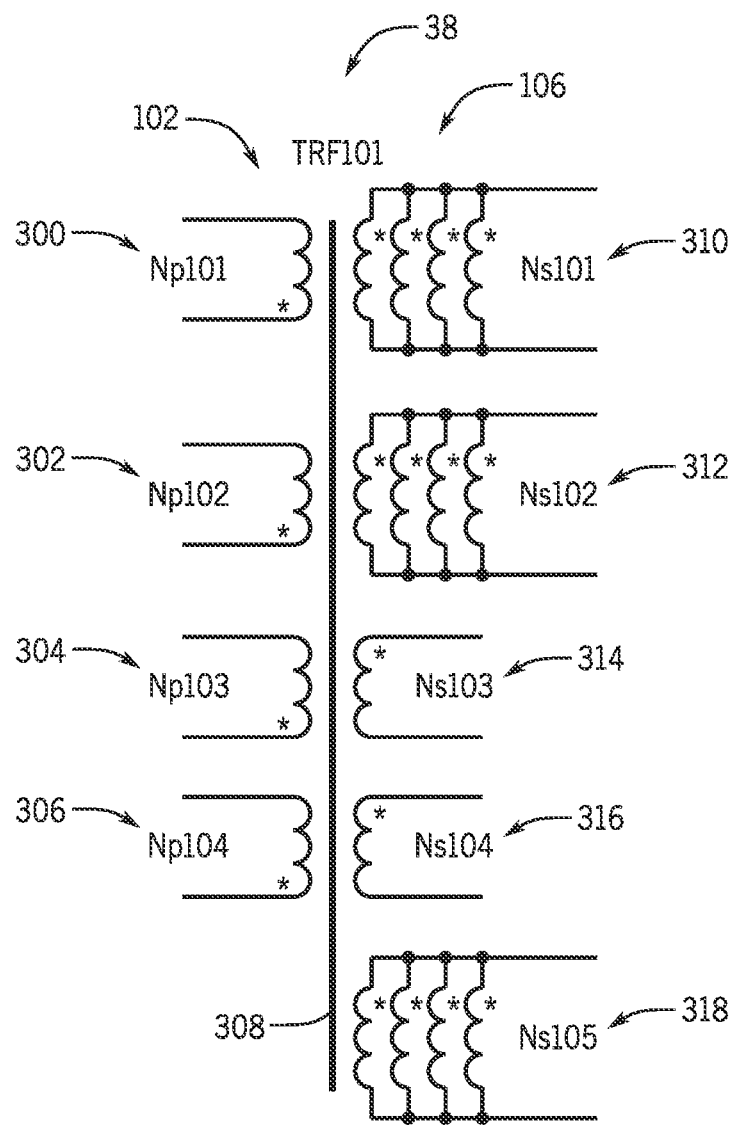
FIG. 4 is a schematic diagram illustrating a transformer system, according to an embodiment of the present disclosure.

It may be beneficial to describe the transformer system 38 in more detail. Turning now to FIG. 4, the figure illustrates a schematic of an embodiment of the transformer system 38 illustrating further details of the primary winding 102 and secondary winding 106. In the depicted embodiment, four primary windings 300, 302, 304, and 306 are depicted, wound around a toroidal magnetic core 308. Complementary secondary windings 310, 312, 314, 316, and auxiliary windings 318 are also shown. In certain embodiments, the resulting transformer system 38 may then meet certain desired specifications. For example, the input voltage range may be between 300 V and 1,500 V, with the input voltage divided symmetrically over the four primary windings 300, 302, 304, and 306. Four output voltages may be provided, with two output voltages of 25 V at 8 amperes (A), one output voltage of 25 V at 1 A, and one output voltage of 400 V at 3 A. A total output power maximum of at least 2,000 Watts may be provided with isolation voltage in continuous operation.

A very good degree of coupling of primary 102 and secondary 106 transformer 38 windings is generally desired. A good coupling may cause a correspondingly symmetrical current and voltage distribution of the serial switched (e.g., via switching devices 116, 118) primary transformer windings 102. Tension proportional to the winding may be possible with a very good coupling. This proportional tension may be possible if all windings involved in the magnetic flux match their number of turns, i.e., cores where windings are above the air gap or are in the vicinity are generally not desired. These cores include: pot (P), pot core module (PM), rectangular modular (RM) and cores with homogeneously distributed micro air gaps, such as those currently used for storage chokes and other flyback converters.

Figure 5:
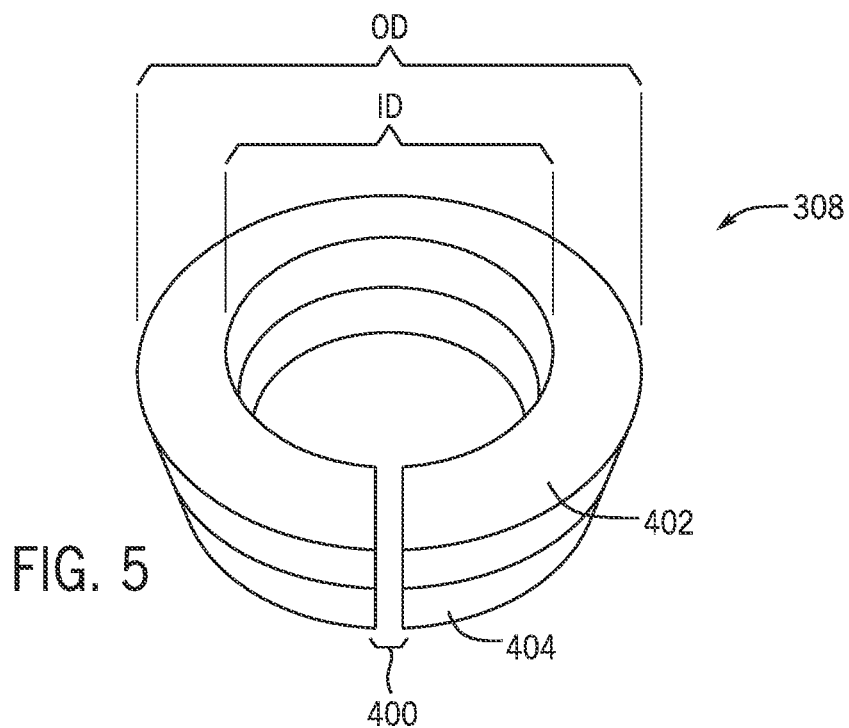
FIG. 5 is a perspective view illustrating a toroidal air gap magnetic core, according to an embodiment of the present disclosure.

The techniques described herein instead use the toroidal air gap magnetic core 308, as further illustrated in FIG. 5. More specifically, the figure is a perspective view illustrating an embodiment of the toroidal air gap magnetic core 308 with an air gap 400. In the illustrated embodiment, the toroidal air gap magnetic core 308 is manufactured by joining two separate toroidal cores 402, 404 into the single toroidal air gap magnetic core 308. In one embodiment, the separate toroidal cores 402, 404 are joined using a double-sided adhesive tape after first manufacturing the air gap 400 in each of the toroidal cores 402, 404.

Each of the toroidal cores 402, 404 may have an outside diameter (OD) of between 50 and 150 millimeters (mm) and an inner diameter (ID) of between 30 and 90 mm. The toroidal cores 402, 404 may be manufactured out of a high permeability material such as N87 material available from TDK Electronics AG's subsidiary EPCOS of Munich, Germany. In the depicted embodiment the air gap has a length of between 5 and 10 mm, and in one embodiment, is 7 mm. The toroidal air gap magnetic core 308 may then be wound with both the primary 102 and secondary 104 windings, as further described below.

Figure 6:
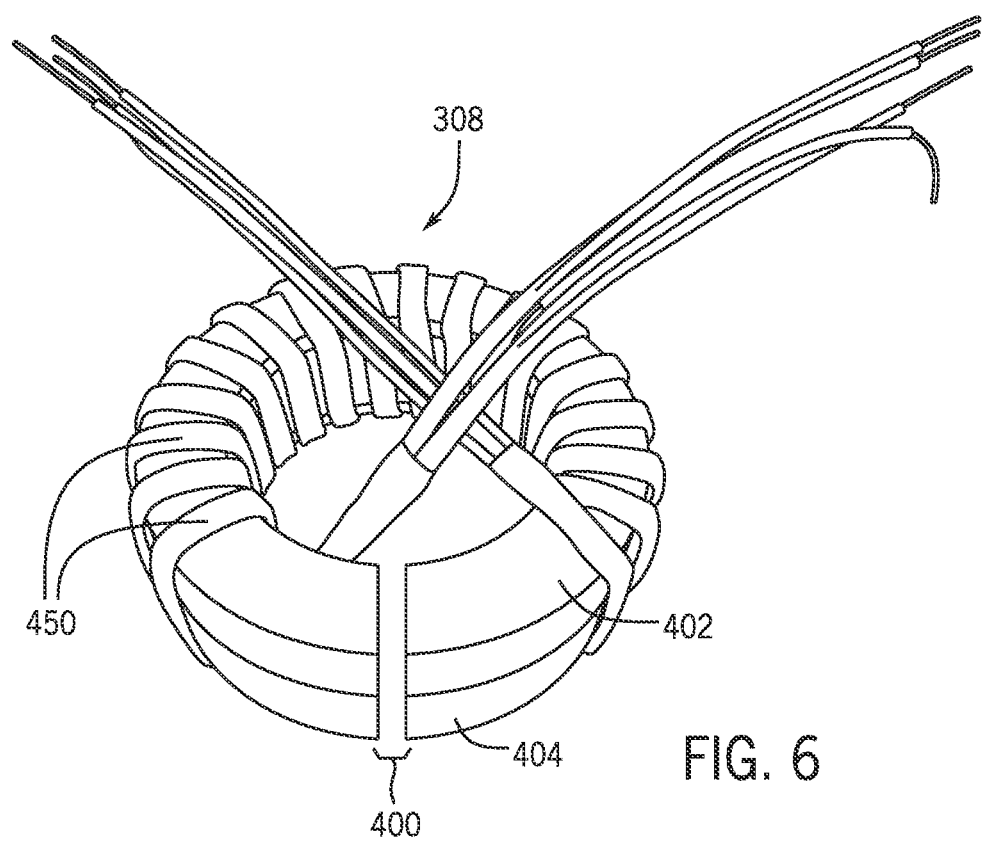
FIG. 6 is a perspective view illustrating the toroidal air gap magnetic core of FIG. 5 with certain primary windings, according to an embodiment of the present disclosure.
Figure 7:
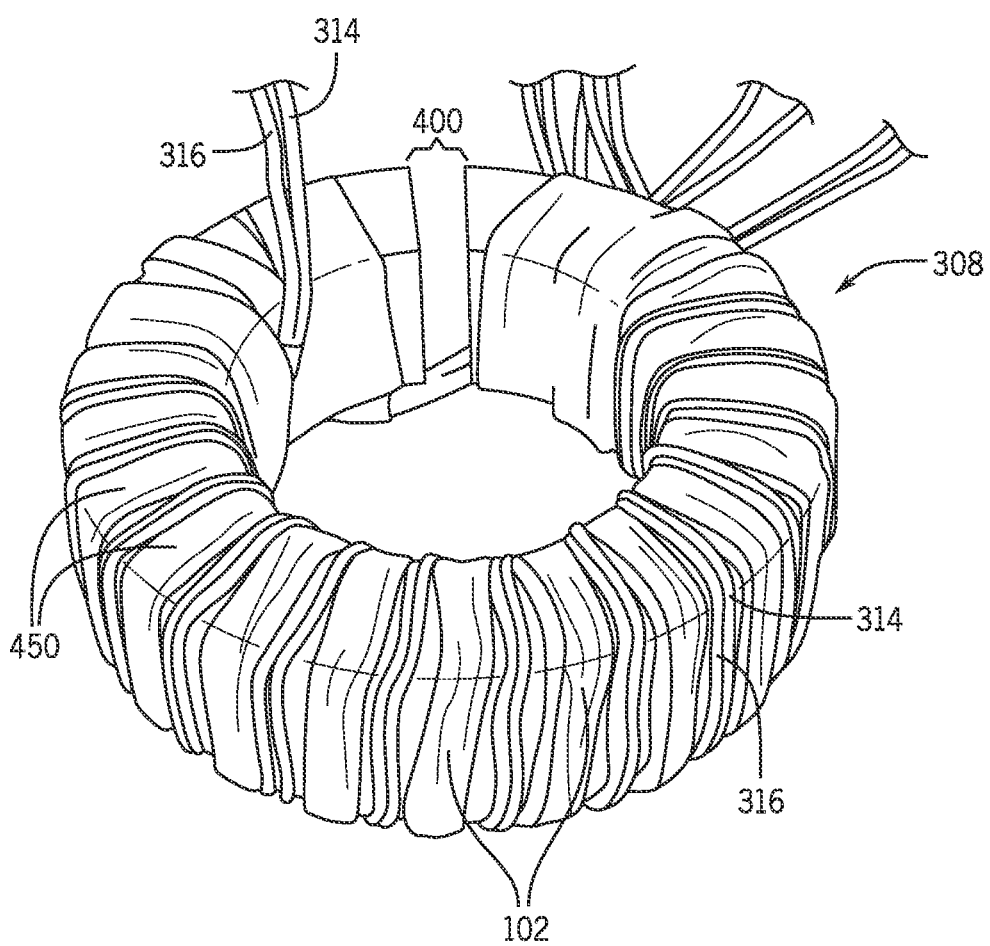
FIG. 7 is a perspective view illustrating the toroidal air gap magnetic core of FIG. 5 with certain primary and secondary windings, according to an embodiment of the present disclosure.

The primary winding wires may become a flat component tape when combined with insulating tape (e.g., 6 kV tape) 450 as shown in FIG. 6. In one embodiment, the wrap overlap is 50% so that the total insulation thickness corresponds to twice the insulating material thickness. The primary winding tape 102, including 300, 302, 304, and 306, may now be placed with sufficient distance to the air gap of the core 308 to be wound, such as greater than 10 mm from the air gap 400. The secondary windings 104, e.g., 400V windings, may then be applied as shown in FIG. 7. In the figure, two partial windings (e.g., 314, 316) are shown. The windings are to be applied as close as possible to the core 308 and to the primary winding 102. This winding technique may lead to a minimal leakage inductance between the primary/secondary windings 102, 106.

Figure 8:
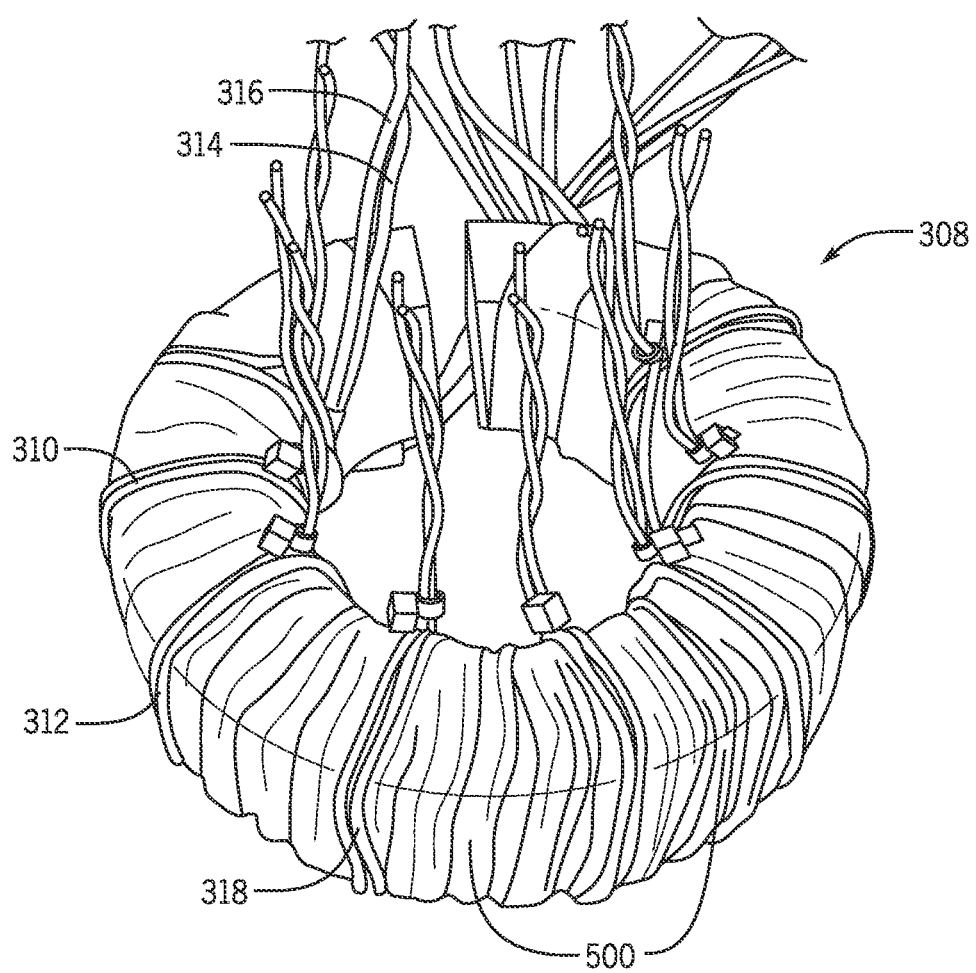
FIG. 8 is a perspective view illustrating the toroidal air gap magnetic core of FIG. 7 with added secondary windings, according to an embodiment of the present disclosure.

Turning now to FIG. 8, the figure illustrates further applications of secondary windings 106. More specifically, after applying the secondary insulation, the two windings 310, 312 (e.g., 24V windings) and auxiliary voltage winding 318 are wound. Since the windings 310, 312 only consist of 2 turns, they are each fourfold on the core 308, which may result in a more stable average stress and also an improved flux distribution at the core. By providing for improved winding techniques in conjunction with the circuitry 36, the flyback converter system 30 may provide for increased energy efficiencies and reliability of operations.

Figure 9:
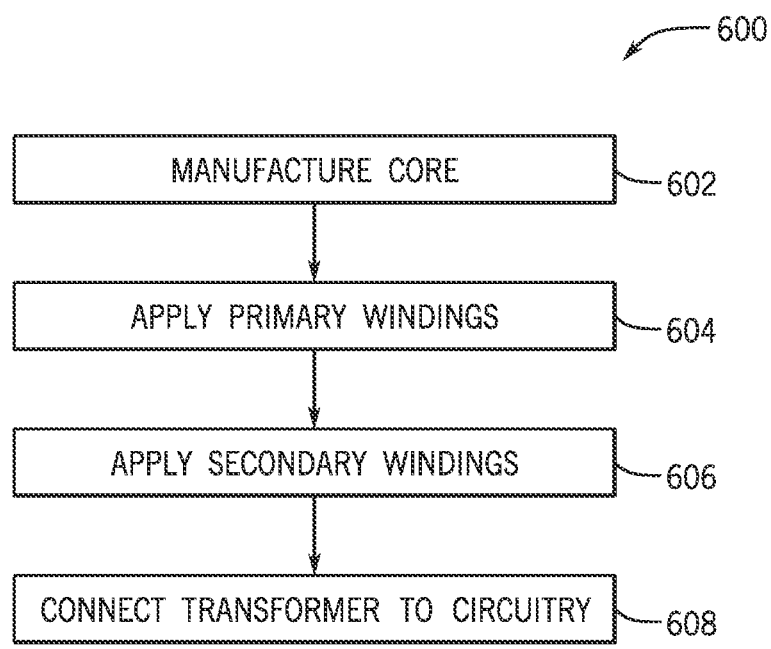
FIG. 9 is a flowchart illustrating process for manufacturing the flyback converter system of FIG. 1, according to an embodiment of the present disclosure.

Turning now to FIG. 9, the figure is a flowchart illustrating an embodiment of a process 600 suitable for manufacturing the flyback converter system 30. In the depicted embodiment, the process 600 may first manufacture (block 602) a transformer core, such as the transformer core 308. In certain embodiments, the transformer core may be manufactured (block 602) by combining two cores with dual sided adhesive. Each core may have an air gap, such as the air gap 400, ground before the adhesive is applied. The resultant core, e.g., core 308, may then be ready for application of the primary and secondary windings 102, 106.

In the depicted embodiment, the process 600 may apply (block 604) the primary windings 102. For example, as described above, the primary winding 102 conductors may be wrapped flat in insulation and applied onto the core 308 at a desired distance away from the air gap 400. Application (block 604) of the primary windings 102 may also include applying insulation material over the windings once they are wrapped onto the core 308. Once the primary windings 102 are applied (block 604), the process may then apply (block 606) the secondary windings 106. In certain embodiments, certain of the secondary windings (e.g., windings 310, 312) may only consist of two turns, and may be fourfold on the core 308. The process 600 may then connect the resultant transformer system 38 to certain driver circuitry (block 608), such as the flyback converter circuitry 36, to manufacture the flyback converter system 30. The flyback converter system 30 may then provide for increased energy efficiencies even in environments such as subsea environments.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. Furthermore, any of the features shown and/or described with respect to FIGS. 1-9 may be combined in any suitable manner.

What is claimed is:

1. A flyback converter system comprising:
   a transformer system having a magnetic core; and
   a flyback converter circuitry having a primary circuitry and a secondary circuitry,
   wherein the flyback converter circuitry is electrically coupled to the transformer system,
   wherein the flyback converter circuitry is configured to recycle energy from a leakage flux via the primary circuitry and to transfer the energy to the secondary circuitry, and
   wherein the magnetic core comprises a first magnetic core portion and a second magnetic core portion stacked in a vertical configuration, and wherein each of the first magnetic core portion and the second magnetic core portion has a circumference spanning less than 360 degrees, such that an air gap is formed in the magnetic core.

2. The flyback converter system of claim 1, wherein the flyback converter circuitry comprises a first switching device and a first capacitor configured to recycle the energy.

3. The flyback converter system of claim 2, wherein the first switching device is connected in series with the first capacitor and coupled to a primary winding of the transformer system.

4. The flyback converter system of claim 3, wherein the flyback converter circuitry comprises a second switching device connected in series with the first switching device and with the first capacitor and connected to a first input node of the flyback converter circuitry.

5. The flyback converter system of claim 4, comprising a second capacitor connected in parallel with the first input node and a second input node of the flyback converter circuitry and configured to be charged via the first input node and the second input node.

6. The flyback converter system of claim 1, wherein the magnetic core comprises a toroidal core.

7. The flyback converter system of claim 1, wherein the transformer system comprises primary windings and secondary windings.

8. The flyback converter system of claim 7, wherein the primary windings comprise four first windings and wherein the secondary windings comprise four corresponding second windings and one auxiliary winding.

9. A method for manufacturing a flyback converter system, comprising:
   manufacturing a transformer system having a magnetic core; and
   manufacturing a flyback converter circuitry having a primary circuitry and a secondary circuitry,
   wherein the flyback converter circuitry is electrically coupled to the transformer system,
   wherein the flyback converter circuitry is configured to recycle energy from a leakage flux via the primary circuitry and to transfer the energy to the secondary circuitry, and
   wherein the magnetic core comprises a first magnetic core portion and a second magnetic core portion stacked in a vertical configuration, and wherein each of the first magnetic core portion and the second magnetic core portion has a circumference spanning less than 360 degrees, such that an air gap is formed in the magnetic core.

10. The method of claim 9, wherein manufacturing the transformer system comprises winding primary windings and secondary windings.

11. The method of claim 10, wherein the primary windings comprise four first windings and wherein the secondary windings comprise four corresponding second windings and one auxiliary winding.

12. The method of claim 10, comprising electrically coupling the primary circuitry to the primary windings and the secondary circuitry to the secondary windings.

13. The method of claim 9, wherein the flyback converter circuitry comprises a first switching device and a first capacitor configured to recycle the energy.

14. A power supply system, comprising:
   a flyback converter system, comprising:
      a transformer system having a magnetic core; and
      a flyback converter circuitry having a primary circuitry and a secondary circuitry,
      wherein the flyback converter circuitry is electrically coupled to the transformer system,
      wherein the flyback converter circuitry is configured to recycle energy from a leakage flux via the primary circuitry and to transfer the energy to the secondary circuitry, wherein the power supply system is configured to supply power via the secondary circuitry, and
      wherein the magnetic core comprises a first magnetic core portion and a second magnetic core portion stacked in a vertical configuration, and wherein each of the first magnetic core portion and the second magnetic core portion has a circumference spanning less than 360 degrees, such that an air gap is formed in the magnetic core.

15. The power supply system of claim 14, wherein the flyback converter circuitry comprises a first switching device and a first capacitor configured to recycle the energy, and wherein the first switching device is connected in series with the first capacitor and coupled to a primary winding of the transformer system.

16. The power supply system of claim 14, wherein the flyback converter circuitry comprises a second switching device connected in series with the first switching device and with the first capacitor and connected to a first input node of the flyback converter circuitry.

17. The power supply system of claim 14, wherein the transformer system comprises primary windings and secondary windings.

* * * * *